US005904604A

United States Patent [19]

Suzuki et al.

[11] Patent Number: 5,904,604

[45] Date of Patent: May 18, 1999

[54] WATERCRAFT ELECTRICAL SYSTEM

[75] Inventors: Masaru Suzuki; Masanori Takahashi, both of Hamamatsu, Japan

[73] Assignee: Sanshin Kogyo Kabushiki Kaisha, Hamamatsu, Japan

[21] Appl. No.: 08/758,035

[22] Filed: Nov. 27, 1996

[30] Foreign Application Priority Data

Nov. 28, 1995 [JP] Japan .................................... 7-309365

[51] Int. Cl.[6] ..................................................... B60K 41/00

[52] U.S. Cl. ............................ 440/84; 123/195 P; 440/53

[58] Field of Search ............................. 123/195 E, 195 P, 123/195 W, 509; 440/53, 84–87, 88, 89, 900

[56] References Cited

U.S. PATENT DOCUMENTS

| | | | |
|---|---|---|---|
| 4,689,025 | 8/1987 | Ferguson | 440/61 |
| 5,370,563 | 12/1994 | Yamazaki et al. . | |
| 5,501,188 | 3/1996 | Fukuoka . | |
| 5,553,586 | 9/1996 | Koishikawa et al. | 440/900 |

*Primary Examiner*—Ed L. Swinehart

*Attorney, Agent, or Firm*—Knobbe, Martens, Olson & Bear LLP

[57] ABSTRACT

An electrical system is disclosed for a watercraft powered by an outboard motor with an internal combustion engine having a block defining a crankcase at one side and having a cylinder head generally positioned on an opposite side thereof, the engine oriented such that an output shaft thereof extends vertically. The electrical system includes a starter and generator mounted generally alongside the crankcase of the engine and between the ends thereof, the generator driven by a flexible belt extending in engagement with the output shaft, and the starter motor positioned for engagement with a flywheel positioned on the output shaft of the engine.

7 Claims, 10 Drawing Sheets

WATERCRAFT ELECTRICAL SYSTEM

FIELD OF THE INVENTION

The present invention relates to an electrical system for a watercraft powered by an outboard motor, and more specifically to such a system which includes a generator and a starter motor positioned with an internal combustion engine within a cowling of the outboard motor.

BACKGROUND OF THE INVENTION

One arrangement for the electrical system of a conventional four-cycle engine is that where certain electrical system features are driven by a greatly extended end of a crankshaft of the engine. In this arrangement, the crankshaft has a first end and a second end, the second end extending outwardly of the engine in driving engagement with a drive shaft or similar feature. The first end of the crankshaft also extends from the engine. Normally, the first end of the crankshaft has a cam shaft drive member positioned thereon. The crankshaft extends further outwardly beyond the cam shaft drive member to drive a generator and/or one or more other electrical features of the engine which are positioned beyond the end of the engine about the crankshaft.

Alternatively, the flywheel is often positioned at the end of the engine on that portion of the crankshaft extending to the drive shaft. In this arrangement, the generator and/or other electrical system features may be provided within a flywheel chamber at end of the engine.

When a four-cycle engine is utilized in a watercraft application, problems arise with respect to the above-stated orientations of electrical components. These problems are due, in part, to the mounting of the engine vertically within an outboard motor cowling. In an outboard motor application, the engine is mounted so that the crankshaft extends generally vertically down from the engine to a drive a propeller.

So arranged, it is undesirable for the engine or its associated components to extend too far above the outboard motor's pivot point to the watercraft. If the engine is too tall, its center of gravity is high, making it more difficult to trim the outboard motor. As disclosed above, the first arrangement for the electrical components has the disadvantage that the engine has an excessive height because the generator and other features are positioned beyond the end of the engine for convenient driving by the greatly extended crankshaft. Another problem with the first arrangement disclosed above is that the crankshaft is quite expensive to manufacture, needing sufficient reinforcement to be of sufficient strength to support the components along its length.

The second arrangement disclosed above has the advantage that the generator and other electrical components are positioned lower in the motor. In an outboard motor setting, however, water invasion is an ever present hazard. In this arrangement where the electrical components such as the generator is positioned at the bottom end of the engine, they are subject to water damage if extensive sealing mechanisms are not employed. In addition, this second arrangement requires a ventilation mechanism to prevent damage to the components from heat generated by the engine.

A watercraft electrical system which provides for compact and convenient mounting of the electrical components is desirable.

SUMMARY OF THE INVENTION

In accordance with the present invention, there is provided an electrical system for an internal combustion engine of an outboard motor powering a watercraft. The engine preferably comprises a block defining a crankcase at one side and having a cylinder head connected thereto at an opposite side and cooperating therewith to define at least one variable volume combustion chamber. The engine is oriented such that an output shaft thereof extends from the engine in a generally vertical orientation, with a top end of the shaft extending upwardly from a top end of the engine and a bottom end of the shaft extending beyond the bottom end of the engine in driving relation with a water propulsion device of the motor.

In accordance with the present invention, the electrical system includes a generator and a starter motor, both of which are positioned generally alongside the crankcase of the engine and between the ends of the engine.

Preferably, the generator is mounted such that it is positioned just below the top end of the engine with a drive shaft thereof extending upwardly slightly beyond the top end of the engine to a drive belt extending from the output shaft of the engine, whereby the generator drive shaft is driven by the output shaft of the engine.

When the flywheel of the engine is positioned on the output shaft at the bottom of the engine, the starter motor is positioned generally below the generator alongside the crankcase of the engine. In this arrangement a shaft of the starter motor extends downwardly parallel to the output shaft and a pinion gear positioned on the shaft is positioned adjacent the flywheel for engagement therewith. In a second arrangement, where the flywheel is positioned on the output shaft at the top of the engine, the starter motor is preferably positioned adjacent the generator. The starter motor's shaft extends upwardly parallel to the output shaft such that the pinion gear is positioned adjacent the flywheel for engagement therewith.

Further objects, features, and advantages of the present invention over the prior art will become apparent from the detailed description of the drawings which follows, when considered with the attached figures.

DESCRIPTION OF THE PREFERRED EMBODIMENTS OF THE INVENTION

Figure 1:
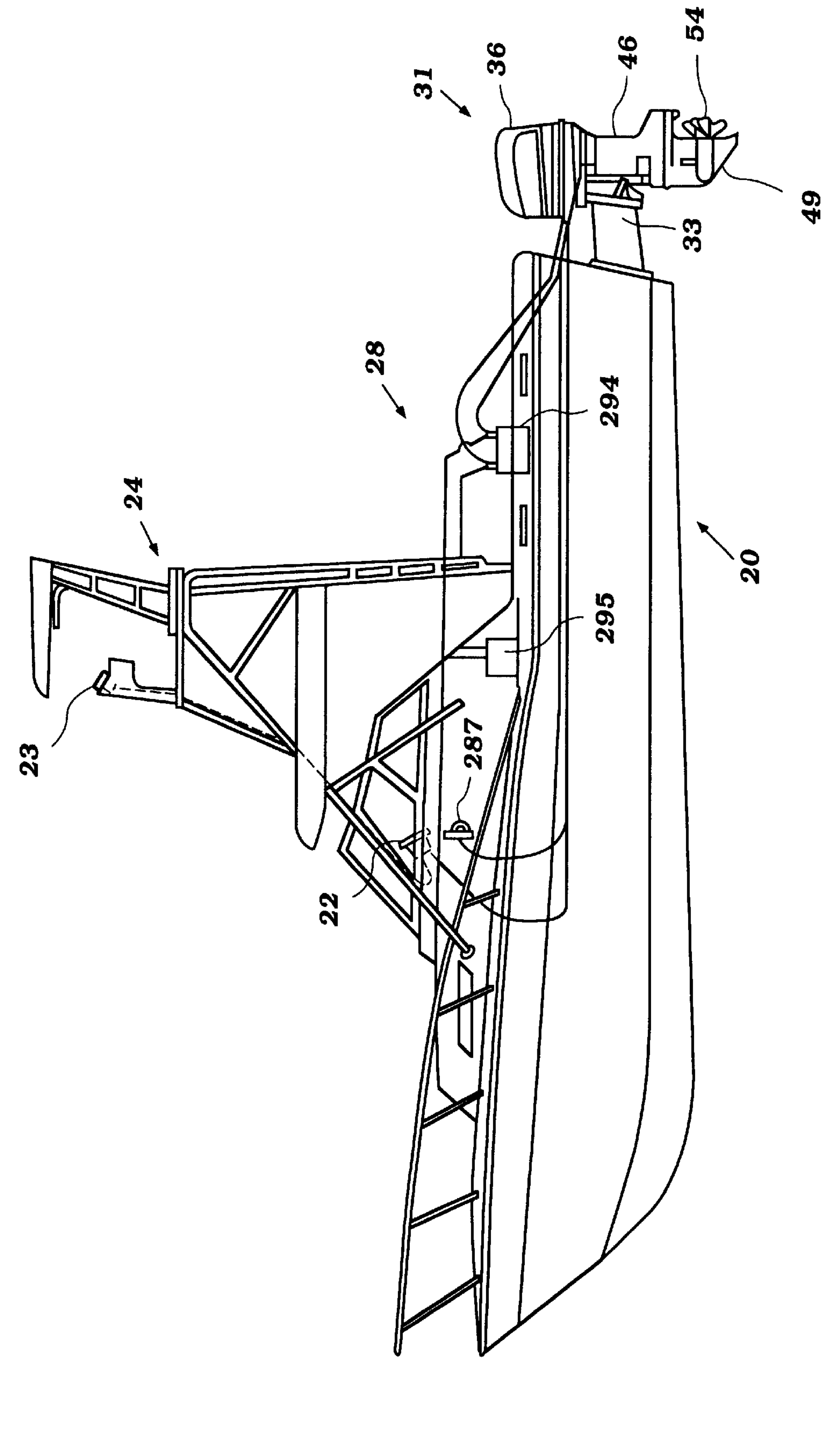
FIG. 1 is a side view of a watercraft powered by an outboard motor and having an electrical system in accordance with the present invention.

In accordance with the present invention, there is provided a watercraft electrical system. FIG. 1 illustrates a watercraft 20 which is powered by an outboard motor 31, the watercraft 20 having an electrical system 28 in accordance with the present invention.

The watercraft 20 may take any of a variety of forms, and as illustrated is of the type utilized for deep-sea fishing. The watercraft 20 has a main operating control area 22 and a secondary operating control area 23 positioned on a platform 24 of the watercraft 20. The watercraft 20 also a transom 33 positioned at a stern of the watercraft 20, to which is mounted the outboard motor 31.

Figure 2:
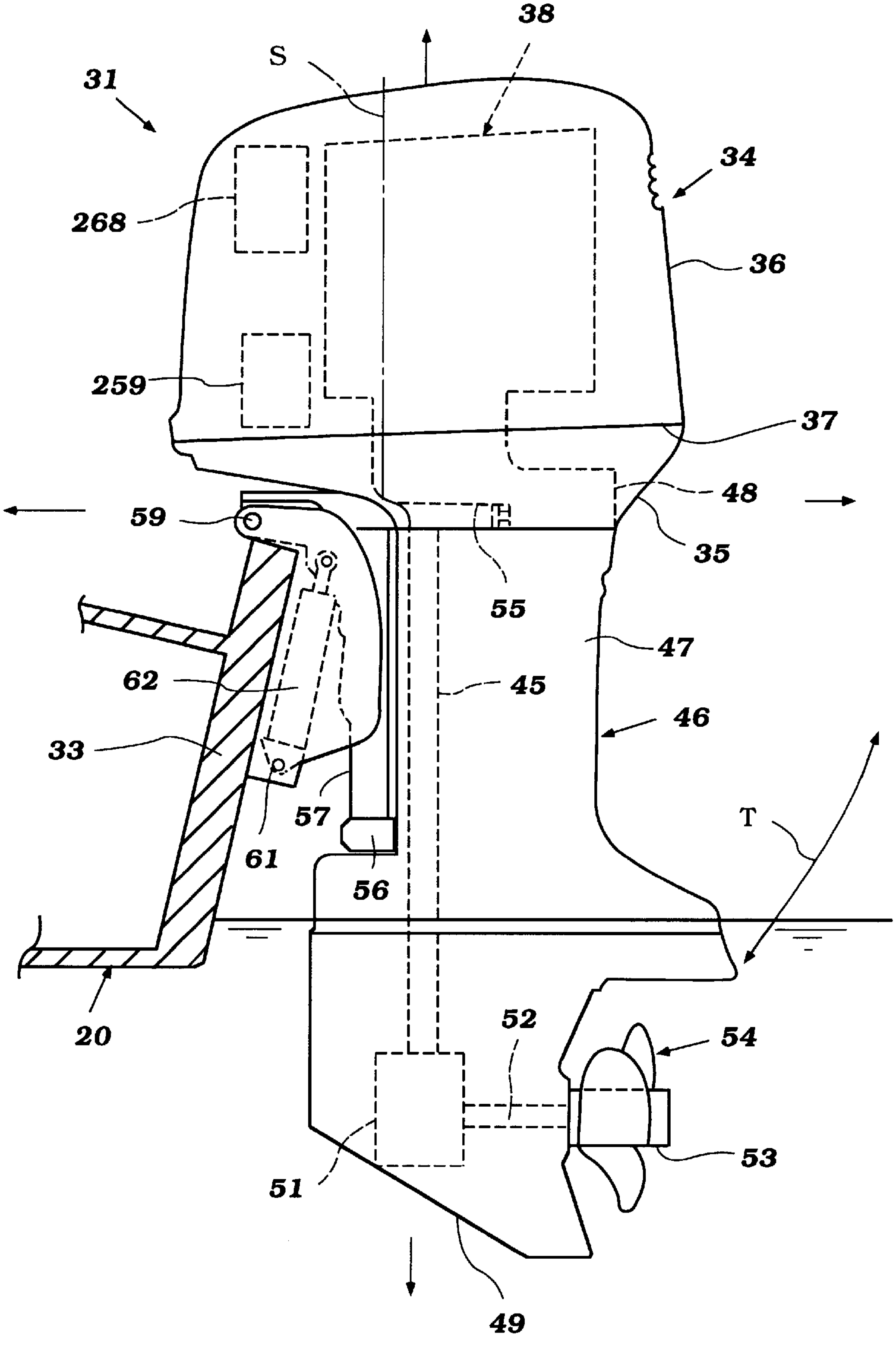
FIG. 2 is an enlarged side view of the outboard motor illustrated in FIG. 1 with internal portions shown in phantom.

As best illustrated in FIG. 2, the outboard motor 31 which powers the watercraft 20 has a powerhead area 34 comprised of a lower tray portion 35 and a main cowling portion 36. The motor 31 includes a lower unit 49 extending downwardly therefrom. A steering shaft, not shown, is affixed to the lower unit 49 by means of a lower bracket 56. The steering shaft is supported for steering movement about a vertically extending axis within a swivel bracket 57. The swivel bracket 57 is connected by means of a pivot pin 59 to a clamping bracket 61 which is attached to the watercraft transom 33. The pivot pin 59 permits the outboard motor 22 to be trimmed and tilted up about the horizontally disposed axis formed by the pivot pin 59 in the direction of arrow T. A hydraulic shock absorber and/or power tilt and trim unit 62 of any known type is interposed between the clamping bracket 61 and the swivel bracket 57 for permitting the outboard motor 22 to move upwardly when an underwater obstacle is encountered, and then return to its original position once the obstacle is cleared.

The power head 34 of the outboard motor 20 includes an engine 38 which is positioned within the cowling portion 36. The engine 38 is preferably of the V-4 type, and thus includes a cylinder block 39 which has a pair of cylinder banks that are closed by cylinder head assemblies 41 in a manner which will be described. Cam covers 42 are affixed to the cylinder head assemblies 41 and enclose respective cam chambers in which the valve actuating mechanism, which will be described, is contained. This valve actuating mechanism is comprised of a pair of twin overhead camshafts for each cylinder head assembly.

A crankcase member 43 is affixed to the end of the cylinder block 39 opposite the cylinder heads 41. A crankshaft 44 is rotatably journalled in a crankcase chamber formed by the cylinder block 39 and the crankcase member 43. The manner of this journalling will As is typical with outboard motor practice, the engine 38 is mounted in the power head 34 so that the crankshaft 44 rotates about a vertically extending axis. This facilitates coupling to a drive shaft 45 in a manner which will be described. The drive shaft 45 depends into and is journalled within a drive shaft housing, indicated generally by the reference numeral 46, and which is enclosed in its upper end by the tray 35. This drive shaft housing 46 includes an outer housing casing 47. An exhaust guide plate assembly 48 is interposed, in a manner to be described, between the engine 38 and the upper end of the drive shaft housing 46.

The drive shaft 45 depends into the lower unit 49, wherein it drives a conventional bevel gear, forward neutral reverse transmission, indicated generally by the reference numeral 51 and shown only schematically. The transmission 51 is shown in a schematic fashion because its construction per se forms no part of the invention. Therefore, any known type of transmission may be employed.

The transmission 51 drives a propeller shaft 52 which is journalled within the lower unit 49 in a known manner. A hub 53 of a propeller, indicated generally by the reference numeral 54, is coupled to the propeller shaft 52 for providing a propulsive force to the watercraft hull 32 in a manner well known in this art.

The construction of the engine 38 will now be described in more detail, referring first primarily to FIGS. 3–7. As has been noted, the engine 38 is of the V-type and, accordingly, the cylinder block 39 is formed with a pair of angularly related cylinder banks, each of which is formed with a plurality of horizontally extending cylinder bores 63. These cylinder bores 63 may be formed from thin liners that are either cast or otherwise secured in place in the cylinder block 39. Alternatively, the cylinder bores 63 may be formed directly in the base material of the cylinder block 39. Where light alloy castings are employed for the cylinder block 39, however, such liners are preferred.

In the illustrated embodiment, the engine 38 is, as noted, of the V-6 type, and hence, each cylinder bank, indicated by the reference numeral 64, is formed with three cylinder bores 63. The cylinder bores 63 of the cylinder bank 64 are preferably staggered relative to each other.

Pistons 65 are supported for reciprocation in the cylinder bores 63. Piston pins 66 connect the pistons 65 to respective connecting rods 67. The connecting rods 67, as is typical in V-type practice, may be journalled in side-by-side relationship on a common throw 68 of the crankshaft 44. That is, pairs of cylinders, one from each cylinder bank 64, may have the big ends of their connecting rods 67 journalled in side-by-side relationship on a common crankshaft throw 68. This is one reason why the cylinder bores 63 of the cylinder bank 64 are staggered relative to each other. In the illustrated embodiment, however, separate throws are provided for the cylinders of each bank. The throw pairs are nevertheless disposed between main bearings of the crankshaft to maintain a compact construction.

The crankshaft 44 is journalled, as previously noted, for rotation about a vertically extending axis within a crankcase chamber 69, formed by the crankcase member 43 and a skirt 71 of the cylinder block 39. This manner of journalling will be described later by reference to other figures in connection with the description of the lubricating system, including FIG. 5.

The cylinder heads 41 are provided with individual recesses 72 which cooperate with each of the cylinder bores 63 and the heads of the pistons 65 to form the combustion chambers. These recesses 72 are surrounded by a lower cylinder head surface that is held in sealing engagement with either the cylinder blocks 64 or with cylinder head gaskets interposed therebetween, in a known manner. These planar surfaces of the cylinder head may partially overlie the cylinder bores 63 to provide a squish area, if desired. The cylinder heads 41 are affixed in any suitable manner to the cylinder block banks 64.

Because of the angular inclination between the cylinder banks 64 and as is typical with V-type engine practice, a valley 73 is formed between the cylinder heads 41 and in part between the cylinder banks 64. An induction system for the engine, indicated generally by the reference numeral 74, is positioned in part in this valley.

This induction system includes intake passages 75 which extend from a surface 76 of the cylinder heads 41 to valve seats formed in the combustion chamber recesses 72. The arrangement may be such that either a single intake passage and port is formed for each combustion chamber recess 72 or, alternatively, there may be multiple valve seats. Poppet-type intake valves 77 are slidably supported in the cylinder heads 41 in a known manner, and have their head portions engageable with these valve seats so as to control the flow of the intake charge into the combustion chambers through the intake passages 75. The way in which the charge is delivered to these intake passages 75 by the induction system 74 will be described in more detail subsequently.

The intake valves 77 are urged toward their closed positions by coil compression springs (not shown). These valves are opened by intake camshafts 78 which are journalled in the cylinder head assemblies 41 in a manner which will be described in more detail later, by primary reference to FIG. 4. The intake camshafts 78 are driven from the crankshaft 44 by a drive, which will also be described in more detail later, primarily by reference to FIG. 6. The intake camshafts 78 have cam lobes, to be described, which operate the valves 77 through thimble tappets 79.

On the outer side from the valley 73, each cylinder head 41 is formed with one or more exhaust passages 81. The exhaust passages 81 emanate from one or more valve seats formed in the cylinder head recesses 72, and cooperate with exhaust systems that include exhaust manifolds, indicated generally by the reference numeral 82, for discharge to the atmosphere.

Exhaust valves 83 are supported for reciprocation in the cylinder heads 41 in a manner similar to the intake valves 77. These exhaust valves 83 are urged toward their closed positions by coil compression springs (not shown). The exhaust valves 83 are opened by overhead mounted exhaust camshafts 84, which are journalled for rotation in the cylinder heads 41, in a manner which will also be described later. The rotational axes of the intake camshafts 78 and exhaust camshafts 84 are parallel to each other. The exhaust camshafts 84 have cam lobes, to be described later, that cooperate with thimble tappets 85 for operating the exhaust valves 83 in a known manner. Like the intake camshafts 78 the exhaust camshafts 84 are driven from the crankshaft 44 in a manner which will be described.

The valve actuating mechanism as thus far described is contained within cam chambers 86 formed by each cylinder head 41 and closed by the aforenoted cam covers 42.

The induction system 74 for the engine 38 will now be described by primary reference to FIGS. 3 and 6. As is typical with outboard motor practice, the protective cowling, and specifically the main cowling portion 36, is formed with air inlet openings 87. The openings 87 are preferably configured so as to permit copious amounts of air to flow into the interior of the protective cowling while at the same time precluding or substantially precluding water entry. Any of the known inlet type devices can be utilized for this purpose, and therefore, the cowling air inlet openings 87 are shown only schematically.

In conjunction with the induction system for the engine, it is desirable to provide a relatively large plenum area that supplies the individual cylinders through respective runners. The use of a plenum area is desirable so as to minimize the interference from one cylinder to the others. This presents a particular space problem, particularly in conjunction with outboard motors where space is obviously at a premium. Therefore, the induction system 74 is designed so as to provide a large plenum volume and still maintain a compact construction. Furthermore, the construction is such that servicing of the engine is not significantly affected.

The air which enters the protective cowling, and specifically the chamber 88 around the engine 38, flows into an air inlet device 89. It should be noted that the air inlet device 89 faces forwardly away from the cowling inlet openings 87. This, in effect, provides a circuitous path of air flow which assists in separation of water from the inducted air. The air inlet device 89 serves a throttle body 91 through a flexible conduit 92. The flexible conduit 92 is utilized because the air inlet device 89 is mounted on a front timing cover 93 of the engine 38 by a mounting bracket. The throttle body 91 has a flange portion that is connected by fasteners to an extension of a flange 97 (See FIG. 3) of an intake manifold assembly.

A throttle valve is journalled in the throttle body 91 and is operated by a remote actuator. By utilizing a single throttle body 91 and single throttle valve 98 for the entire induction system, the overall construction can be significantly simplified.

The throttle body 91 is also affixed to a Y pipe 99 which is positioned on or forms a part of the flange 97 of the aforenoted intake manifold. This Y pipe 99 has a pair of branch sections 101, each of which extends to a respective plenum chamber 102. The plenum chambers 102 overlie the respective cam covers 42 and are mounted thereon by mounting posts and threaded fasteners so as to provide a rigid assembly. These plenum chambers 102 extend substantially the full length of the respective cylinder banks 41, and thus provide a fairly substantial volume for the inducted air.

Figure 3:
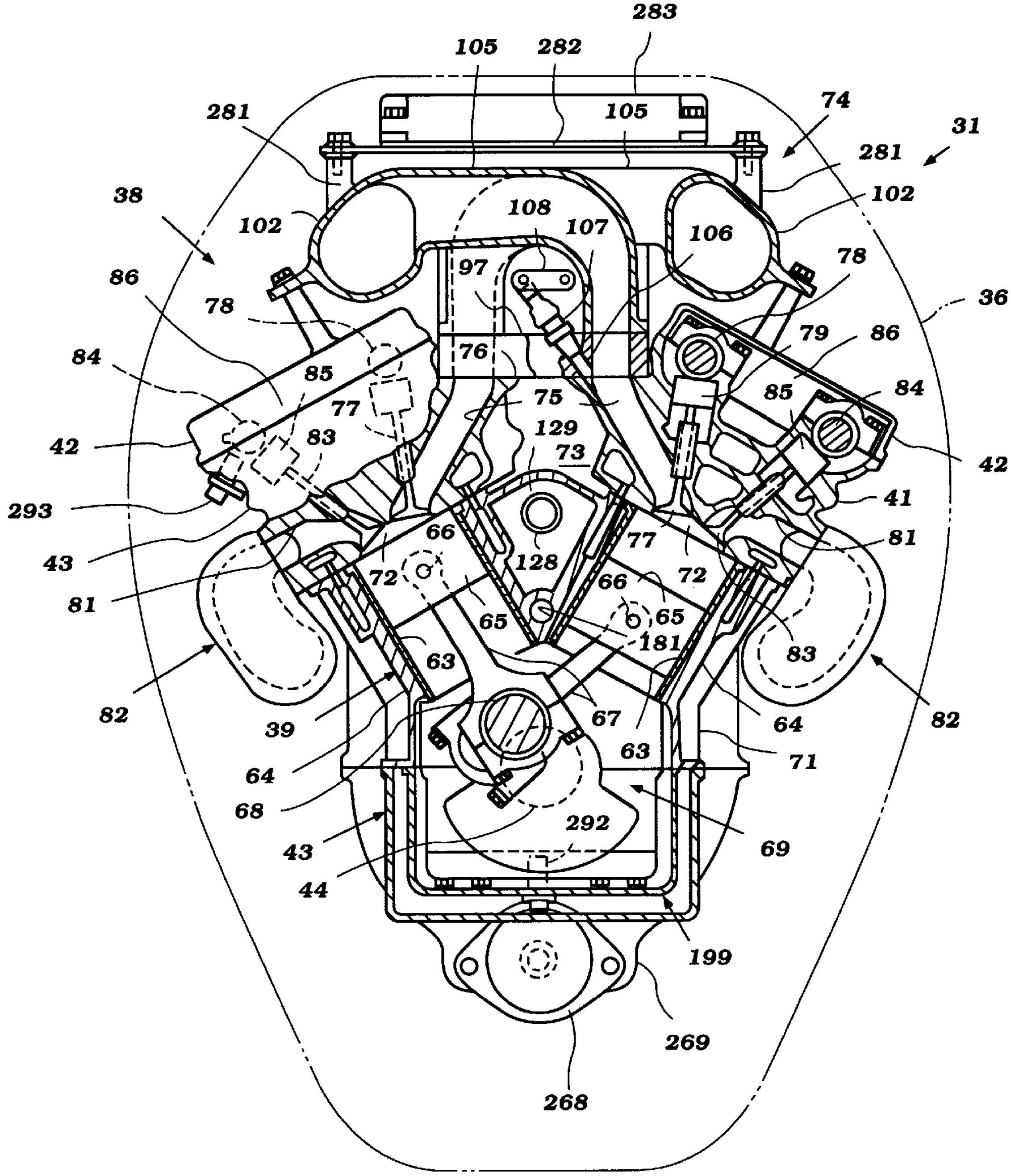
FIG. 3 is a cross-sectional view of an engine of the outboard motor illustrated in FIG. 1, taken along a horizontal plane therethrough.

Each plenum chamber 102 has a plurality of runners, one for each cylinder of the opposite cylinder bank, these runners being indicated by the reference numeral 105 (See FIG. 3). The runners 105 extend transversely across the upper portion of the engine valley area 73 and then turn downwardly so as to communicate with respective passages 106 formed in the manifold flange 97. These passages 106 are in direct alignment with the cylinder head intake passages 75 of the respective cylinder head.

Thus, this arrangement provides not only a large effective plenum chamber volume, since each plenum chamber 102 serves only three cylinders, but also provides relatively long runners 105 that extended from the plenum chamber volumes 102 to the cylinder head intake passages 75. Thus, the length of these runners 105 can be tuned relative to the volume so as to provide the desired charging effect in the induction system. The described arrangement with the long runners 105 is particularly effective at mid-range speeds.

In the illustrated embodiment, the engine 38 is provided with a manifold-type fuel injection system. This fuel injection system also appears in most detail in FIG. 3, and includes a plurality of fuel injectors 107, one for each cylinder head intake passage 75. These fuel injectors 107 are disposed in the area between the re-entrant portions of the manifold runners 105 and hence, are protected by these runners, since they are partially surrounded by them, while at the time being accessible. In addition, air flow over the injectors 107 is possible so as to cool the injectors along with the air flowing through the runners 105. Preferably, the injectors 107 are of the electrically operated type embodying solenoid actuated valves, and hence, there is some heat generated associated with their operation.

The injectors 107 for the respective cylinder banks are mounted in the manifold flange 97 contiguous to its flow passages 106, and in general alignment with the cylinder head intake passages 75, as best seen in FIG. 3. Hence, the spray from the injectors 107 can easily mix with the air flowing into the combustion chamber so as to provide a good mixture distribution.

The injectors 107 have their inlet tip portions received in a fuel rail 108 that extends vertically through the area encompassed by the runners 105 and also protected by them. The fuel rail 108 has two flow passages, one for the injectors 107 of each bank so that the flow passages are in side-by-side relationship and accommodate the crossed-over relationship of the injectors 107 when viewed in top plan.

A suitable fuel supply system is provided for supplying fuel to the fuel rail 108. This supply system includes a pressure regulator that communicates with the fuel rail 108 and which permits the maintenance of the desired fuel pressure by dumping excess fuel back to the fuel tank through an appropriate return conduit. Fuel is supplied to the fuel rail 108 by a suitable supply system, which supply system is not shown further in the figures. Reference may be had to any known type of construction for a suitable fuel supply system.

The fuel rail may be mounted on the manifold flange 97 by means of a plurality of bosses and threaded fasteners so as to provide a rigid assembly and ensure against dislocation of the fuel rail 108 from the injectors 107.

Figure 8:
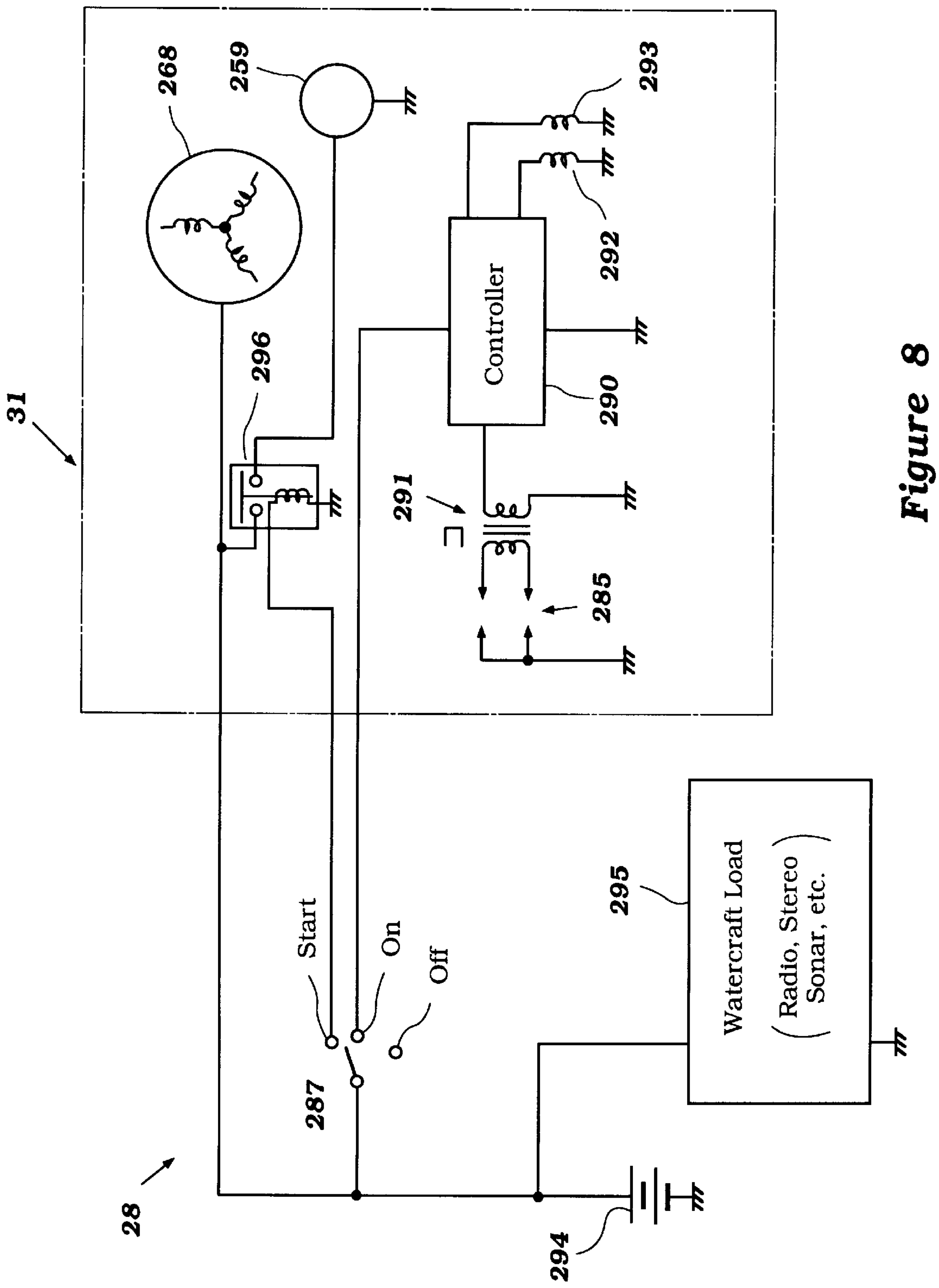
FIG. 8 is a circuit diagram of the electrical system for the watercraft with outboard motor illustrated in FIG. 1.

As illustrated schematically in FIG. 8, spark plugs 285 are mounted in the cylinder heads 41 with their gaps extending into the recesses. These spark plugs are fired by a suitable ignition system described in more detail below, in a known manner.

The drive for the intake and exhaust camshafts 78 and 84 for each of the cylinder banks will now be described by primary reference to FIGS. 3, 4, 5 and 7. It should be noted that each of the camshafts is provided with respective cam lobes 113 and 114 for operating the thimble tappets 79 and 85 associated with the intake and exhaust valves 77 and 83, respectively. Between these pairs of cam lobes, there are provided bearings surfaces on the camshafts 78 and 84. These bearing surfaces of the camshafts are journalled within cylinder head bearing surfaces. Bearing caps 116 are affixed to the cylinder heads 41 so as to complete the journalling of the intake and exhaust camshafts 78 and 84.

The intake and exhaust camshafts 78 and 84 of each cylinder head 41 are connected for simultaneous rotation by means of a timing chain 117 that meshes with sprockets 118 and 119 formed on the intake and exhaust camshafts 78 and 84, near but not at one end thereof, respectively. This interconnection between the camshafts 78 and 84 of each cylinder head 41 permits only one of these camshafts to be driven by the crankshaft by a timing mechanism, which will be described shortly. This facilitates and simplifies the timing chain arrangement for the overall engine.

Figure 7:
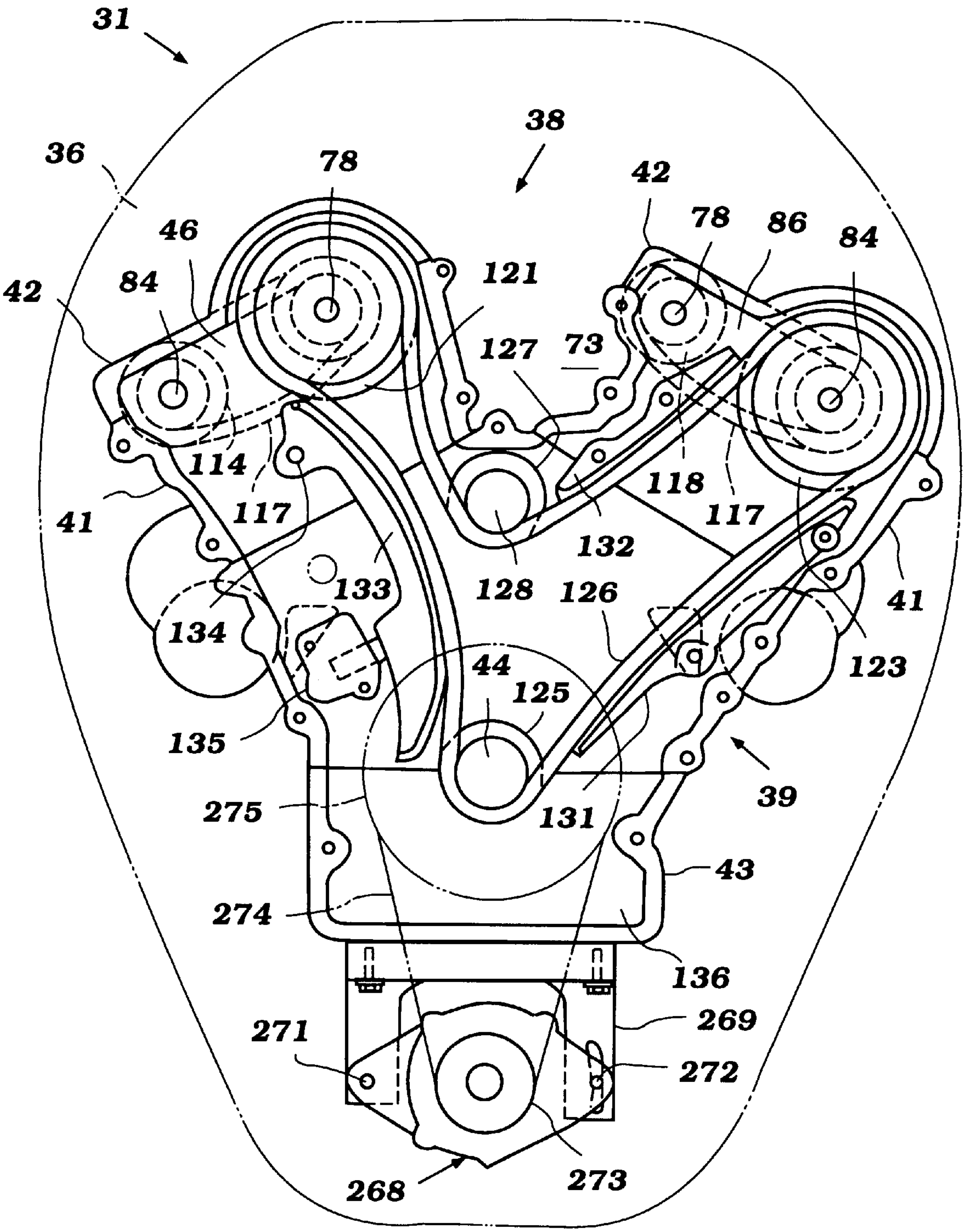
FIG. 7 is a top view of the engine with a front or timing cover plate and portions of the induction system thereof removed.

To accomplish this drive, a driving sprocket 121, is affixed to the upper end of the intake camshaft 78 of the left-hand cylinder bank when viewed in top plan view, as seen in FIG. 7. This sprocket is held in place by a threaded fastener 122. In a similar manner, a timing sprocket 123 is affixed to the upper end of the exhaust camshaft 84 of the remainder cylinder head 41 by means of a threaded fastener 124.

Figure 6:
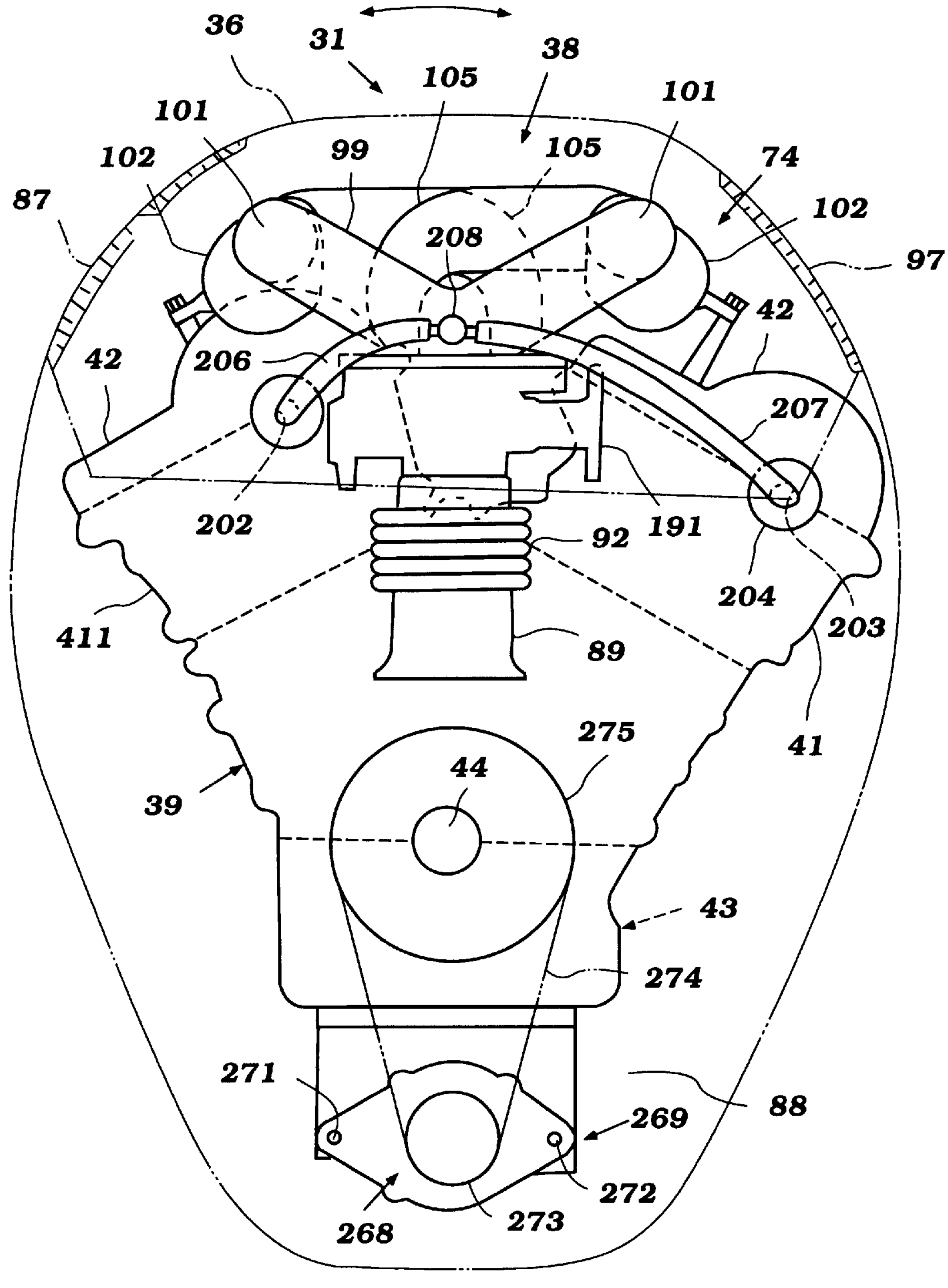
FIG. 6 is a top view of the engine illustrated in FIGS. 2–5 illustrating an induction system thereof and the drive system for the generator.

As seen in FIGS. 6 and 7, a timing sprocket 125 is affixed for rotation with the upper end of the crankshaft 44 in an appropriate manner. This sprocket 125 has a diameter equal to one half of the diameter of the cam shaft sprockets 121 and 123 to provide the one half to one speed ratio for the camshafts 78 and 84 as is required. A timing chain 126 is trained over the crankshaft sprocket 125 and engages first the sprocket 123 of the exhaust camshaft 84 of the right-hand cylinder bank. Hence, this camshaft is driven directly from the crankshaft 44 at a one-half speed ratio, as is known in this art. As has been previously noted, the intake camshaft 78 of this cylinder bank is driven from the exhaust camshaft 84 by the timing chain 117.

From the sprocket 123, the timing chain 126 passes downwardly into the valley between the cylinder banks where it engages an idler sprocket 127 that is journalled on an idler shaft 128 and which has a smaller diameter than the sprockets 121 and 123 to maintain a compact construction. The idler shaft 128 is journalled in a chamber 129 formed in the cylinder block immediately below the valley 73. The cylinder block is provided with a pair of walls in which bearings 130 (See FIG. 5) are positioned for journalling the idler shaft 128.

The chain 126 then turns upwardly so as to drive the timing sprocket 121 of the intake camshaft 78 associated with the remaining cylinder head 41. As has been previously noted, the exhaust camshaft 84 of this cylinder bank is driven by the timing chain 117.

From the sprocket 121, the timing chain 126 returns to the crankshaft-driven sprocket 125, as best illustrated in FIG. 7. A first timing chain guide rail 131 is mounted in the timing chain case formed by the timing cover 93 at the front of the cylinder block and engages the driving flight of the chain 126 to maintain it in contact with the crankshaft sprocket 125 and the exhaust camshaft sprocket 123. A similar guide rail 132 is mounted in the right-hand bank cylinder head 41 to engage the flight of the chain 126 passing between the sprocket 123 and the idler sprocket 127.

Finally, a tensioner guide 133 is pivotally supported on the remaining cylinder head 41 about a pivot pin 134. A hydraulically urged tensioner element 135 engages the tensioner guide 133 and maintains the desired tension on the trailing or return side of the drive chain 126.

It should be noted that the cylinder heads 41, cylinder block 39 and crankcase member 43 all have sealing surfaces seen in FIG. 7 that are sealingly engaged by the timing case cover 93 so as to form a closed chamber at least one function of it which will be described later. This timing case chamber is indicated generally by the reference numeral 136.

Figure 4:
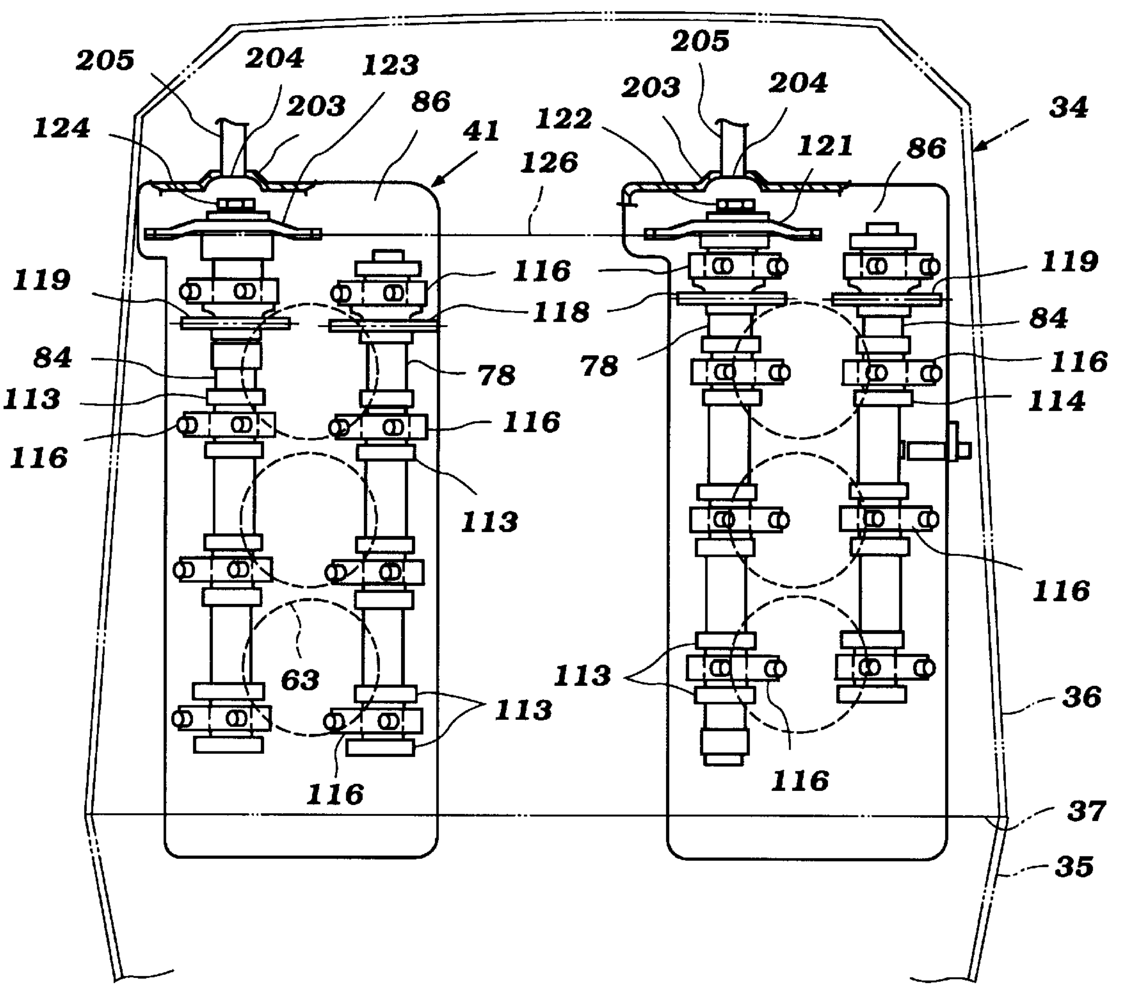
FIG. 4 is a cross-sectional view of the engine of the outboard motor illustrated in FIG. 1, taken along a first vertical plane therethrough and illustrating the camshafts of said engine.
Figure 5:
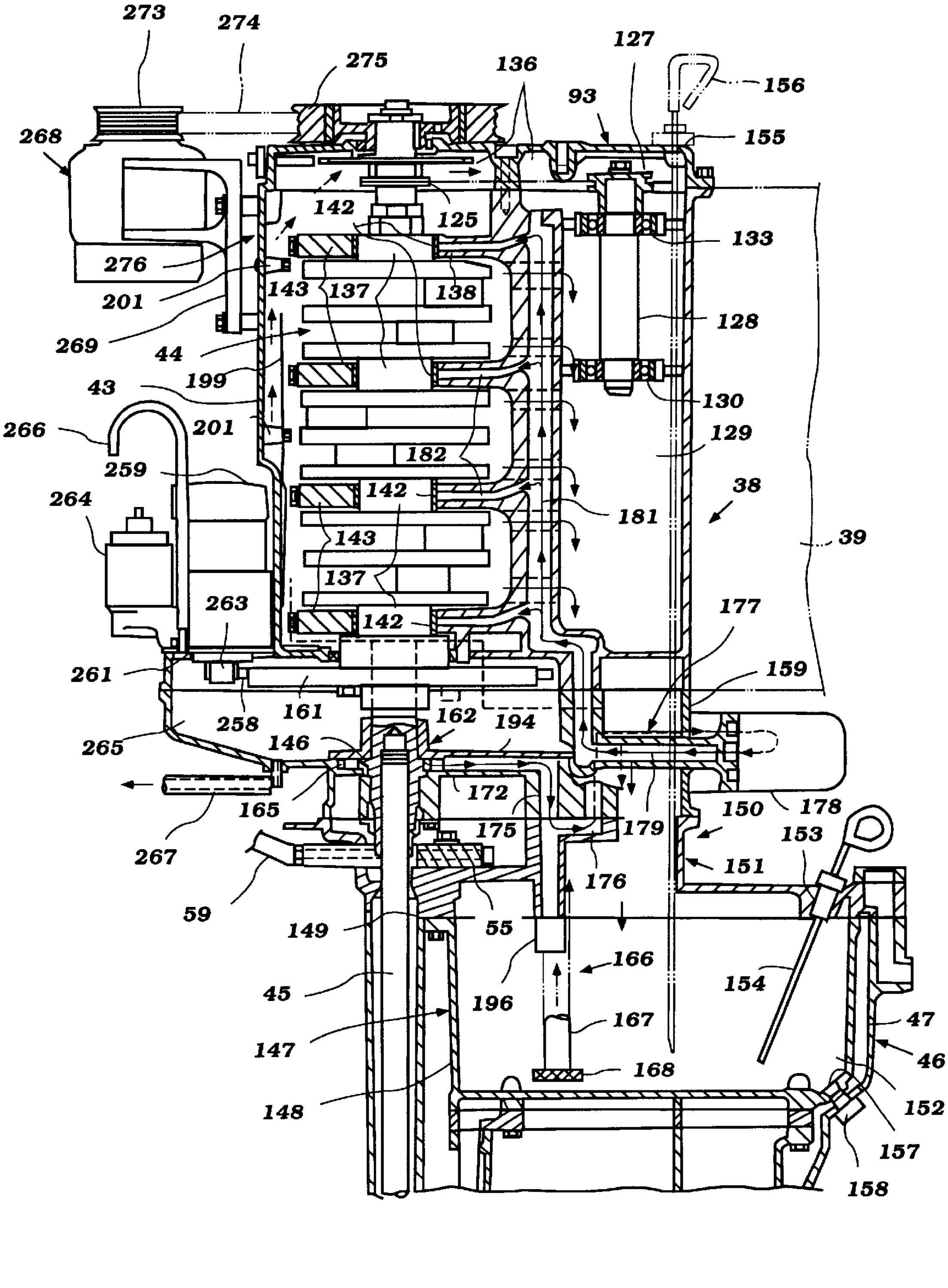
FIG. 5 is another cross-sectional view of the engine of the outboard motor illustrated in FIG. 1, taken along a second vertical plane therethrough, and illustrating a generator and starter positioned in accordance with the present invention.

The lubricating system for the engine 38 including the arrangement for journalling the crankshaft 44 and the crankcase ventilating system will now be described by reference primarily to FIGS. 3–5. As illustrated in FIG. 5, the crankshaft 44 is formed with four main bearing surfaces 137, each of which is configured so as to be aligned with a bearing surface formed in a respective web 138 of a skirt portion of the cylinder block 39. These bearing surfaces are indicated at and are adapted to receive segmented bearings 142. Bearing caps 143 are affixed to these cylinder block webs 138 by threaded fasteners 145 and thus complete the journalling of the crankshaft 44 in the crankcase chamber formed by the skirt and the crankcase member 43.

FIG. 5 shows in more detail the coupling between the lower end of the crankshaft 44 and the upper end of the drive shaft 45. This coupling is indicated generally by the reference numeral 146 and has a connection at its upper end to or is integrally formed with the lower end of the crankshaft 44 and a splined connection to the upper end of the drive shaft 45. As will be described later, the oil pump for the engine is also provided in this area.

Obviously, the vertical disposition of the crankshaft 44 and the crankcase chamber necessitates the use of a dry sump type of lubrication system for the engine. In order to maintain a relatively low center of gravity and still to maintain a large oil capacity, an oil reservoir or storage tank 147 is positioned so as to extend in substantial part into the upper end of the drive shaft housing 46. Specifically, this oil reservoir includes an outer housing 148 that has an outwardly extending flange 149 that affords a means for affixing the oil tank housing 148 to a lower plate 151 which extends across the upper end of the drive shaft housing 46 and which forms the lower portion of an exhaust guide plate assembly indicated generally by the reference number 150.

This closure plate 151 has a recessed lower area which forms an extension of the oil tank 147 and thus provides a large internal cavity 152 having a configuration which will be described in added detail later. The upper end of the closure plate 151 to the rear of the engine 38 and in the area below the valley 73 as provided with a oil fill and dipstick receiving opening 153 in which a ullage rod or dipstick 154 is positioned. Alternatively, the timing case cover 93 may be provided with a fill opening 155 in order to pass a longer ullage rod or dipstick 156 as shown in phantom in FIG. 5. Either arrangement permits ease of checking of the oil level in the reservoir chamber 152 and replenishing of it.

The oil tank forming shell 148 has a portion that extends rearwardly adjacent the drive shaft housing outer shell 148 and which is formed with a drain opening 157. A drain plug 158 is threaded into this drain opening so as to normally prevent leakage of oil from the tank 147. However, the tank 147 can be easily drained by removing the plug 158 without necessitating removing any outer cowling or without removing the outboard motor 31 from the watercraft transom 33.

The upper end of the closure plate 151 is engaged by an upper closure plate, indicated generally by the reference numeral 159 which completes the exhaust guide assembly 150. The upper closure plate of the exhaust guide 150 defines a flywheel chamber in which a flywheel 161 is contained. The flywheel 161 is affixed to the crankshaft 44 above the coupling 146 to the drive shaft 45 and above the previously-referred to oil pump, which is indicated generally by the reference numeral 162. The oil pump 162 is of the geroter type, having an internal gear or rotor which has a connection to the crankshaft 44 so as to rotate with it. This inner rotor has teeth that are intermeshing with teeth of an internal cooperating pumping member 165 that is contained within the pumping cavity formed by the closure member 159 so as to operate as a high pressure, positive displacement pump, as is well known in this art.

Again referring to FIG. 5, an oil pickup, indicated generally by the reference numeral 166, depends from the closure plate 159 into a lower area of the oil tank reservoir 152. This oil pickup 166 includes a pickup tube 167 having a strainer 168 at its lower end. The upper end of the tube 166 cooperates with an inlet formed by the closure member 159 and which communicates with an inlet oil path for delivering lubricant from the oil reservoir 147 to the oil pump 162.

Extending parallel to this inlet path is an oil discharge path 173 formed in a further portion 174 of the lower closure plate 159. This path 172 communicates with a discharge nipple 175 which, in turn, flows into a passage 176 formed in the exhaust guide 150.

This passageway 176 communicates with a further passageway 177 formed in the closure member 159 which communicates with the inlet side of a replaceable oil filter of the cartridge type 178. This oil filter 178 is conveniently positioned adjacent the upper surface of the oil tank 147 and in proximity to one of the alternative ullage rod or dipstick locations 154, 156. As a result, the oil filter may conveniently be replaced again only with the necessity of removing the upper protective cowling 36.

The outlet side of the oil filter 178 communicates with a lubricant supply passage 179 which, in turn, communicates with a main oil gallery 181 formed in the cylinder block at the area on the lower end of the chamber 129 in which the idler shaft 128 is journalled. This main oil gallery 181 is shown in FIGS. 3 and 5 and extends along the webs 138 where the main bearings 142 for the crankshaft 44 are positioned. Each of these webs is provided with a drilling 182 so that the lubricant under pressure can pass to the main bearings 142. These drillings extend in an upward direction from their discharge ends so as to provide a trap like effect to reduce the likelihood of reverse oil flow. The webs 138 have the oil supply passages 182 that communicate therewith for delivery to the bearings 142 and the corresponding journal surfaces 137 of the crankshaft 44. Hence, there is a copious supply of lubricant under pressure to the main bearings of the crankshaft. Any lubricant which seeps from this area will be returned back to the oil tank 147 through a return path.

The upper face of the cylinder block 38 is formed with auxiliary galleries (not shown) which intersect the main oil gallery 181 and deliver oil to further passageways that extend upwardly toward the cylinder heads 41 and which communicate at their upper ends with other passages in the cylinder heads 41. These passages extend from their lower ends toward the cam shaft bearing surfaces 115 at this end of the cylinder head. A branch passage may also be provided from the passageway so that both the intake and exhaust cam shaft bearing surfaces 115 will be serviced.

The cam shafts 78 and 79 are provided with longitudinally drilled galleries that communicate with these passages through cross drillings. These passages allow oil to flow axially along the cam shaft 78 and 84 to exit paths that are disposed adjacent each of the bearing surfaces 115 for lubricating these bearing surfaces.

The lubricant which seeps from the cam shaft bearing surfaces 115 can drain downwardly through each of the cylinder heads 41 to their lower ends. This lubricant will also pass over the valve tappets 71 and the guides which support the intake and exhaust valve 77 and 83 so as to lubricate these components. This oil flows through drain openings formed in the lower end of the cylinder heads 41. These drain openings communicate with corresponding drain openings in the cylinder block and which open into a drain chamber formed in the lower face of the cylinder block 39.

A drain passage formed therein permits the lubricant to then pass downwardly in the area beneath the idler shaft chamber 129 as shown in FIG. 5 and to drain back into the oil tank 148. In this regard, it should be noted in reference to FIG. 5 that the oil supply line 176 leading to the oil filter has a pressure regulator valve 196 disposed at its lower end. Oil pressure is regulated by opening of this pressure regulator valve 196 and dumping excess oil back to the oil tank 147.

Lubricant that has entered the crankcase chamber in which the crankshaft 44 rotates also may drain through a drain passage formed in the lower end of the cylinder block end wall around the flywheel 161. Similar drain passages 198 are formed in the webs 138 so as to ensure that the oil that has passed through the engine will all return back to the oil tank 147.

The engine 38 is provided with a crankcase ventilating system in which an air flow through the crankcase chamber of the crankshaft and other internal components of the engine including the cam chambers 86 is permitted to circulate. Rather than using atmospheric air, and, in accordance modem emission standards, the blow-by gases that escape past the pistons 65 are utilized for this purpose. These gases circulate through the crankcase chamber 69 and other internal chambers of the engine and then are delivered to the induction system for further combustion so as to avoid unwanted emission of high amounts of hydrocarbons to the atmosphere.

This crankcase ventilation and emission control system appears in most detail in FIGS. 3, 4 and 6 and will now be described by particular reference to those figures. First, as illustrated in FIG. 3, there is provided a baffle plate, indicated generally by the reference numeral 199 that is mounted in the crankcase chamber 69 and which is specifically mounted on bosses 201 of the crankcase member 43. As may be best seen in FIG. 5, this baffle plate 199 generally encircles the crankshaft 44 and will prevent any oil which may seep past the main bearings 142 from being thrown against the crankcase member 43.

Rather, this seepage of oil will be thrown against the baffle plate 199 so that air can flow on both sides of the baffle plate as shown in the broken arrows and thus, prevent this liquid lubricant from mixing with the ventilating air. Rather, the lubricant will impinge on the baffle plate 199 and condense on this plate because of its lower temperature and because of the cooling air flow across it. This oil can then drain to the lower portion of the crankcase chamber and drain back to the oil reservoir 147 through the path previously described.

The wall that separates the crankcase chamber from the balance shaft chamber 129 is provided with a plurality of openings which permit the ventilating air to flow through the chamber 129 and also to sweep any oil that may deposit in this chamber back toward the oil reservoir 147. These ventilating gases then can flow upwardly to the timing case chamber 136 formed at the front of the engine and moved to the upper portion and also circulate the cam shaft chambers 86.

The upper portion of the timing case cover 93 is provided with a pair of elevated portions 203 that have openings 204 that receive nipples 205. These nipples 205 are connected to a pair of flexible conduits 206 and 207 (FIG. 6) which then leads to the Y-pipe 99 of the intake manifold at an intermediate point 208 therein immediately downstream of the throttle body 91. Hence, this will provide a lower pressure discharge area that causes the crankcase ventilating gases to be drawn upwardly and out of the engine ventilating chambers and into the induction system. Thus, any hydrocarbons in these ventilating gases will be subject to the heating in the combustion chamber and will then further vaporize and be burned off so that they will not pollute the atmosphere.

The exhaust manifolding system that delivers the exhaust gases from the cylinder head exhaust passages 81 through a hub underwater exhaust gas discharge or other exhaust gas discharge system for the outboard motor 31 is illustrated partially FIG. 3.

Before describing this system in detail, it should be noted that in conventional outboard motor practice, the exhaust manifold is generally formed integrally within the cylinder block and/or cylinder heads. The exhaust system is another area where the design of internal combustion engines must be particularly adapted for outboard motor application. Unlike other types of engine applications, the space and length available for the exhaust system of an outboard motor is extremely limited. Therefore, a large portion of the silencing of the exhaust gases is accomplished by cooling of the exhaust gases.

Thus, it has been the practice to form the exhaust manifolds in the cylinder block and/or cylinder heads, as noted above, so that the engine cooling jacket may additionally cool the exhaust gases to assist in silencing and to maintain heat control. However, these types of arrangements, particularly with larger displacement and larger power engines, tend to be somewhat counterproductive. That is, the heat from the exhaust system actually tends to cause the engine to run hotter than desired and adequate cooling is not provided.

Therefore, the exhaust manifolds 82, aforereferred to, are formed externally of the cylinder heads 41 and cylinder block 39. These exhaust manifolds have flange portions which are connected by threaded fasteners to the sides of the cylinder heads 41. The manifolds 82 runners extend transversely outwardly and are connected to inner tubular parts that extend generally in a downward direction toward the lower end of the engine. These lower portions then curve inwardly to form right angled portions that face toward each other. These portions are connected by means of a flexible hose and hose clamps to a pair of right angle exhaust conduits that curve downwardly and which are affixed to the upper ends of the exhaust guide 150. The exhaust passages formed by the sections are in communication with exhaust passages formed on opposite sides of the exhaust guide 150 and on opposite sides of a rearwardly extending portion of the oil tank 147.

By way of this construction, the oil tank 147 can be of a large volume and also still be protected from the heat transfer from the exhaust system. This area of the oil tank is where the drain opening 157 and drain plug 158 are positioned.

A further exhaust passage is formed in the lower portion 151 of the exhaust guide 150 and exhaust pipes are affixed to the underside of this portion so as to receive the exhaust gases and deliver them to an expansion chamber-type silencing device which is formed in the drive shaft housing 46.

From this expansion chamber device, the exhaust gases may be discharged to the atmosphere through a known type of high-speed underwater exhaust gas discharge. This may include a through the hub propeller discharge. In addition, the exhaust system may also be provided with an above-the-water low-speed exhaust gas discharge port which is formed to the rear of the drive shaft housing 46. Exhaust gases flow from the aforenoted expansion chamber into a further expansion chamber formed in the upper guide plate 159 and which is closed by a cover plate and then downwardly through a restricted opening for discharge through the low-speed exhaust gas discharge.

As is known in the outboard motor art, under high-speed operation the underwater exhaust gas discharge is relatively shallowly submerged and the exhaust gases can easily exit. However, as the watercraft 32 is traveling slower this underwater discharge will become very deeply submerged. This coupled with the low exhaust gas pressures will cause the exhaust gases to exit through low-speed, above-the-water exhaust gas discharge. The expansion chamber coupled with the silencing system in the drive shaft housing and lower unit will facilitate in the silencing of these exhaust gases.

The cooling system for the engine 38 and its related auxiliaries including the exhaust system will now be described by particular reference to FIG. 3. This cooling system includes a cooling arrangement for the exhaust system which has just been described. It will be noted that many of the exhaust conduits which have already been described are encircled by outer tubular members to provide additional cooling jackets and these will be described as a part of the following description.

As is typical without outboard motor practice, cooling water for the engine 38 and for its auxiliaries is drawn from the body of water in which the watercraft is operating. To this end, the lower unit 49 is provided with a water inlet opening which is not shown and which communicates through a conduit with a water pump that is driven off of the drive shaft 45 at an area adjacent where the drive shaft housing 46 and lower unit 49 merge. Since this type of construction is well known in the art, a detailed description of it is not believed to be necessary to permit those skilled in the art to practice the invention since any known type of water pump and drive may be utilized.

This cooling water is then delivered by the water pump upwardly toward the power head through a water delivery conduit to an inlet opening formed in the underside of the oil tank 147. This cooling water inlet opening merges with a pair of angularly-related passages which extend along the lower side of the oil tank 147 and thus provide initial cooling for the oil for the engine.

These passages diverge and end in a pair of outlet ports formed in the upper end of the body 146 which forms the oil tank 147. Thus, the further passages are in proximity to the oil tank 147 and provide additional cooling for the oil therein.

Each of the passages terminates at its upper end in a cooling jacket which encircles the exhaust opening in the exhaust guide or spacer plate 159. Thus, after first cooling the oil, the cooling water engages and encircles the exhaust system for cooling it.

The connecting angle pipes of the exhaust system are provided with outer tubular portions that define a water jacket therebetween which is in open communication with the cooling jackets of the guide plate 159.

The cooling jackets communicate with a further sealed joint which encircles the coupling between the exhaust manifold outlets and the inlet ends of the angle pipes.

Like the angle pipes, the exhaust manifold 82 is provided with an outer shell which forms a cooling jacket around the exhaust manifolds 212. This cooling jacket encircles the individual runners of the exhaust manifold 82 and specifically its inner shell and then exits through exit openings formed at the upper end of each exhaust manifold 82.

A water outlet fitting is affixed to the upper end of each manifold 82 and has an outlet nipple which communicates through a pressure responsive valve to the cooling jacket of the cylinder block 39.

As shown partially in FIG. 3, the cylinder block 39 is formed with cooling jackets which encircle the respective cylinder bores 63. In a similar manner, the cylinder head is formed with cooling jackets. The cylinder head cooling jackets communicate with the cylinder block cooling jackets and specifically with an inlet water gallery formed therein.

The water which has circulated through the portion of the exhaust system as thus far described is returned by the pressure responsive valve to inlet openings formed in the lower face of the cylinder block 39 and which communicates with the water gallery. The water then flows through a return area formed in the upper end of each cylinder block. A water discharge fitting formed internally in the cylinder block and extends through the cam cover 93 where it is connected to a thermostatic valve on each side of the engine. The thermostatic valves control the flow of coolant through the engine, as is well known in this art.

Each thermostatic valve communicates with a respective flexible conduit which then returns the water from the respective bank of the engine 38 (it being noted that each bank has in essence its own cooling system) to respective water return passages formed in the flywheel cover and guide plate 159. These passages communicate with water return passages formed in the lower surface of the guide member 159 and which communicate with water jackets that encircle the attachment end of the exhaust pipes so as to provide cooling around them. The cooling jackets are provided with a plurality of slotted openings permitting the spent cooling water to flow into the area around the exhaust pipes and cool them. In addition, this cooling flow of water further assists in cooling the oil tank 147 and reduces the likelihood of heat transmission from the exhaust system to the lubricating system. This cooling water then drains through drain passages so as to flow out of the lower unit through a suitable return opening. This water may at some lower point be mixed with the exhaust gases to further assist in their silencing and cooling.

From the description of the cooling system it should be readily apparent that the cooler water from the body of water in which the watercraft is operated is first delivered to the exhaust manifolds for their cooling and then is transferred to the engine cooling jackets and subsequently returned in proximity to the exhaust system for further cooling. This system provides not only effective cooling, but also will ensure that the engine reaches its operating temperature sooner. That is, on engine startup the exhaust gases will obviously be the warmest part of the engine, and hence the early contact of the cooling water with the exhaust system will cause it to be heated, and this heat is then transferred to the engine for improved warm-up.

Finally, the engine 38 includes the watercraft electrical system 28 in accordance with the present invention. Referring first to FIG. 5, it has been noted that the engine is provided with the flywheel 161. The flywheel 161 has affixed to it a starter gear 258. A starter motor 259 is mounted on the front lower portion of the engine, and specifically on an extension 261 of the crankcase member 43 and in a recessed area thereof so as to provide a compact construction. The starter motor has a starter shaft to which a pinion gear 263 is affixed for cooperation with the flywheel starter gear 258 for starting of the engine. A starter solenoid 264 is mounted in proximity to the starter motor 259.

It should be noted that the flywheel 161 and the starter gears 258 and 263 are mounted within a cavity 265 formed by the upper guide plate 159, cylinder block 39, and crankcase member 43. A vent tube 266 is provided so as to balance the air pressure in the cavity 265. This vent tube 266 has a siphon-type shape so as to reduce the likelihood of water entry into the flywheel chamber 265. In addition, a drain pipe 267 can drain any accumulated water from the flywheel chamber back to the atmosphere.

As may be best seen in FIGS. 3 and 5–8, the electrical system 28 includes an alternator or generator 268. Most preferably, the generator 268 is mounted at the front of the engine 38 and above the starter motor 259. To this end, a mounting bracket 269 is affixed to the crankcase member 43 at the upper end of the engine by threaded fasteners. This mounting bracket 269 provides connections 271 and 272 to the alternator 268 that permit it to be adjusted. The alternator 258 is provided with a pulley 273, which is driven by a flexible transmitter or belt 274 from a pulley or belt drive 275 affixed to the upper end of the crankshaft 44. The adjustment fasteners 271 and 272 permit the tension of the belt 274 to be adjusted in a manner well known in the art. The crankcase member 43 is preferably formed with a recess 276 so as to permit a more compact assembly.

The alternator or generator 268 supplies electrical power not only to the engine for its operation and control, but also may supply electrical power for charging one or more batteries 294 provided in the watercraft 20 and powering electrical accessories of the watercraft, such as several meters positioned within the boat at the control panels 22, 23 and a watercraft radio, sonar, stereo or similar apparatus 295.

As best illustrated in FIG. 8, the electrical system 28 also includes a ignition controller 290 for controlling the ignition of the spark plugs 285. The ignition controller 290 may be part of a larger electronic control unit (ECU) of the engine. As illustrated, the ignition controller 290 obtains crank and cam angle data from a crankshaft sensor 292 and at least one cam sensor 293 (See also FIG. 3). The ignition controller 290 controls the ignition of the spark plugs 285 through an ignition coil 291.

A main switch 287 is positioned on the watercraft 20 (See FIG. 1) for controlling the operation of the ignition system. The switch 287 can be moved to a “START” position for activating a starter relay 296 which causes the starter 259 to engage the flywheel. After the engine 38 is started, the switch 287 moves to the “ON” position. The switch 287 can be moved to an “OFF” position for stopping ignition.

The engine controls may be conveniently mounted in the protective cowling 36 where they will be protected from heat. It will be seen that each of the plenum chambers 102 is provided with respective bosses 281 on which a mounting plate 282 is affixed. The mounting plate 282 mounts one or more control boxes 283 which may include, among other things, the ignition system for firing the spark plugs of the engine. For example, the ECU may be mounted on the mounting plate 282. This thus provides not only a compact assembly, but also in which the components can be mounted in a way so as to be isolated from the heat of the engine 38. Furthermore, this mounting places the electrical components in a location where they can be easily serviced.

Most importantly, the positioning of the generator 268 and starter 259 in the manner described above solves many problems. First, this mounting arrangement has the advantage that the total height of the engine is minimized, thus permitting the engine 38 to fit within a smaller cowling. In addition, the starter motor 259 is mounted for simple engagements with the flywheel, and below the generator 268, thereby not contributing to any increase in total engine size.

The placement of the generator 268 along the side of the engine 38 puts the weight thereof closer the pivot pin 59, thereby facilitating easier tilt and trim of the motor 31. The positioning of the generator 268 and starter motor 259 on the “crankcase” side of the engine 38 opposite the heads 41 also has the effect of counterbalancing the weight of the heads 41 somewhat, further facilitating easier tilt and trim of the motor 31.

As another aspect of the invention, the position of the generator 268 is sufficient high within the motor’s cowling 36 that the generator is not subject to water damage.

Figure 9:
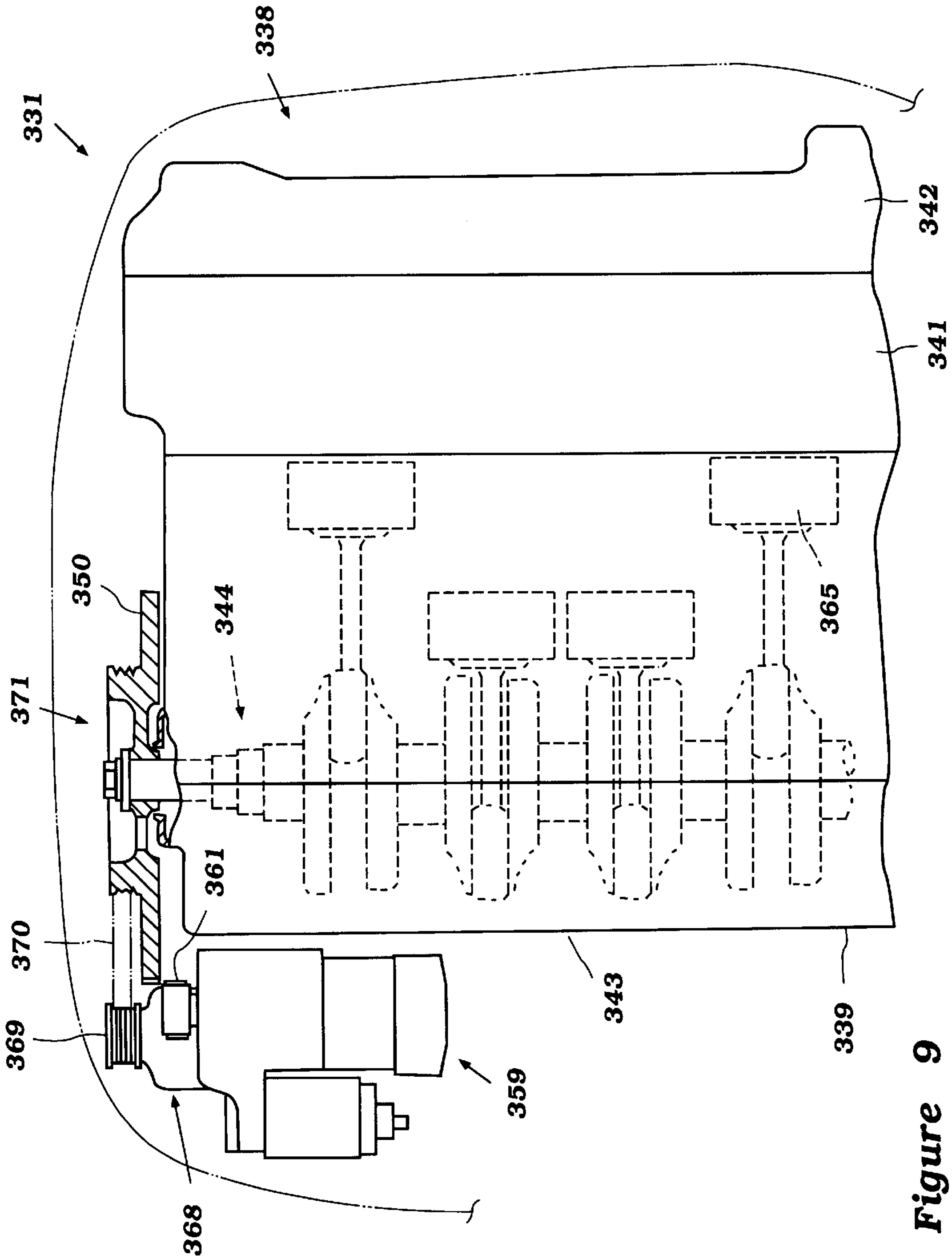
FIG. 9 is a side view of an engine of the inline variety having a starter motor and generator arranged in accordance with the present invention.
Figure 10:
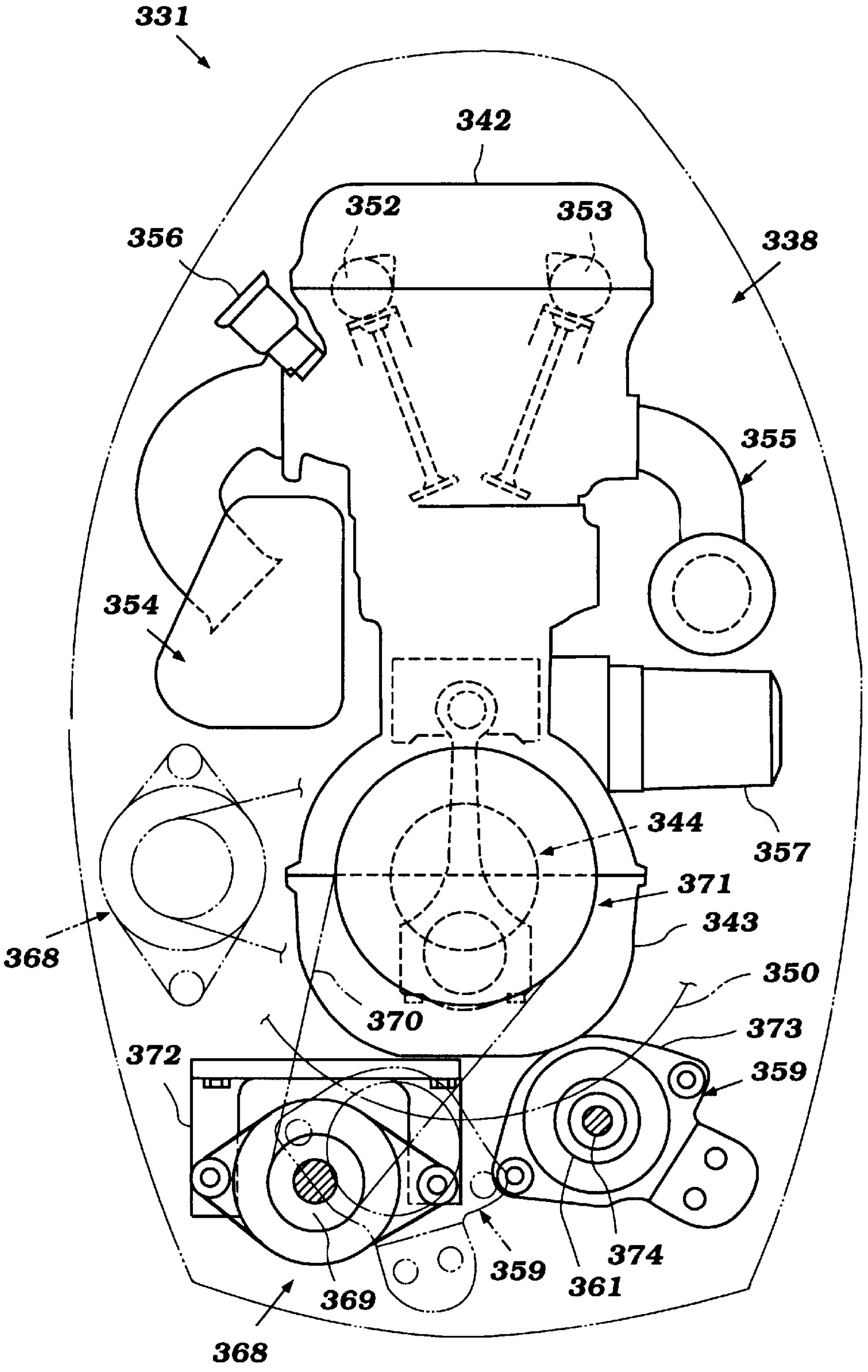
FIG. 10 is an end view of the engine illustrated in FIG. 9.

FIGS. 9 and 10 illustrate a watercraft electrical system 328 in accordance with the present invention as adapted to an inline engine 338 of the four-cylinder variety for use with an outboard motor 331. This engine 338, which is similarly positioned within a cowling of the motor 331, has a block 339 defining a crankcase 343. A head 341 is connected to the block 339 for defining therein four cylinders. Preferably, a piston 365 is mounted for reciprocal motion within each cylinder. The pistons 365 are connected to a crankshaft 344. A camshaft cover 342 is connected to the head 341 over a pair of camshafts 352, 353.

The engine 338 includes an induction system, generally indicated at 354, and an exhaust system, generally indicated at 355. Fuel is injected to the engine 338 through fuel injectors 356. The engine 338 also includes a lubricating system with an oil filter 357. The remainder of the engine 338 will not be described in detail herein, it being understood that such is well known to those skilled in the art.

As applicable to the present invention, a flywheel 350 is positioned on the end of the crankshaft 344 extending from the top end of the engine 338 (i.e. the end opposite the end of the crankshaft 344 which extends downwardly to drive the propeller). The electrical system 328 includes a generator 368 and starter 359. The generator 368 is connected to the engine 338 at the crankcase 343 area thereof (i.e. opposite the head 341) via a bracket disclosed below (See FIG. 10). The generator 368 has a pulley 369 positioned on a shaft thereof, the pulley 369 driven by a belt 370 which extends in driving relationship to a belt drive portion of the flywheel 350.

Similarly, the starter 359 is positioned adjacent the generator 368 with a bracket disclosed below (See FIG. 10). The starter 359 has a shaft 374 which drives a pinion gear 361 for engagement with teeth on the flywheel 350 for rotating the flywheel to start the engine 338, as is well known in the art.

FIG. 10 illustrates two mounting positions for the starter 359 and generator 368 in accordance with the present invention. First, as illustrated in solid lines in FIG. 10, and as illustrated in FIG. 9, the generator 368 and starter 359 may both be generally positioned at the side of the engine 338 at the crankcase 343 thereof. Here, the generator 368 is mounted to a plate 372, and the starter 359 to a separate mounting bracket 373.

In an alternate arrangement illustrated by phantom lines in FIG. 10, the generator 368' is positioned along the side of the engine 338 near the induction system 354, and the starter 359' is positioned at the side of the engine adjacent the crankcase 343.

In the arrangements disclosed, these positions of the generator 368 and starter 359 again have the advantage that the generator and starter motor do not increase the engine’s height and are positioned generally opposite the head portion of the engine. This aids in keeping the center of gravity of the engine and its components close to the motor’s pivot point to the watercraft. Also, in this arrangement, the starter motor’s drive shaft 374 extends upwardly parallel to the crankshaft 344.

Of course, the foregoing description is that of preferred embodiments of the invention, and various changes and modifications may be made without departing from the spirit and scope of the invention, as defined by the appended claims.

What is claimed is:

1. A watercraft powered by an outboard motor having an internal combustion engine powering a water propulsion device, said engine mounted within a cowling of said motor and having a block defining a crankcase at one side and having a head mounted thereto on another side and cooperating therewith to define at least one variable volume combustion chamber, said engine having an output shaft extending generally vertically such that a first end thereof extends beyond a top end of said engine and a second end thereof extends beyond a bottom end of said engine for driving said water propulsion device, a drive pulley positioned on said first end of said output shaft, at least one camshaft generally vertically extending and driven by said output shaft by a camshaft drive mechanism positioned at said top end of said engine, a flywheel positioned on said output shaft at said second end thereof, and further including an electrical system, said system including a generator having a shaft extending therefrom generally parallel to said output shaft, a belt engaging said drive pulley and said shaft of said generator whereby said output shaft drives said generator, said drive pulley positioned above said camshaft drive mechanism at said top end of said engine and a starter motor for engaging said flywheel for starting said engine.

2. The watercraft in accordance with claim 1, wherein said engine has a first bank of combustion chambers and a second bank of combustion chambers generally oriented in a “V” configuration with a valley therebetween, and said generator is positioned opposite said valley.

3. A watercraft powered by an outboard motor having an internal combustion engine powering a water propulsion device, said watercraft having an electrical system, said engine mounted within a cowling of said motor and having a block defining a crankcase at one side and having a head mounted thereto on another side and cooperating therewith to define at least two variable volume combustion chambers, at least one of said chambers in each of a first and a second bank of combustion chambers, said banks of combustion chambers generally oriented in a “V” configuration with a valley therebetween, said engine having an output shaft extending generally vertically such that a first end thereof extends beyond a top end of said engine and a second end thereof extends beyond a bottom end of said engine for driving said water propulsion device, a belt drive positioned on said first end of said output shaft, a flywheel positioned on said output shaft, and further including an electrical system, said system including a generator having a shaft extending therefrom, said generator positioned alongside said engine near said crankcase and opposite said valley with said shaft of said generator extending generally parallel to said output shaft, a belt engaging said belt drive and said shaft of said generator whereby said output shaft drives said generator, and said electrical system further including a starter motor for engaging said flywheel for starting said engine.

4. The watercraft in accordance with claim 3, wherein said flywheel is positioned on said second end of said output shaft at said bottom end of said engine and said starter motor has a shaft extending downwardly from a body thereof generally parallel to said output shaft, and a gear positioned on said shaft adapted for engagement with said flywheel.

5. The watercraft in accordance with claim 3, wherein said crankcase of said engine has a recessed portion in an outer surface thereof in which is positioned at least a portion of said generator.

6. The watercraft in accordance with claim 3, further including a battery, ignition coil, and starter switch in electrical connection with said generator and starter motor.

7. The outboard motor in accordance with claim 3, wherein said generator and said starter motor are positioned generally side-by-side near said top end of said engine.

* * * * *